Oct. 12, 1954

G. HENRY ET AL

2,691,247

PROCESS OF AND APPARATUS FOR DRAWING
GLASS INTO SHEET FORM

Filed Aug. 4, 1949

INVENTORS
Georges Henry
Edgard Brichard
By Georges Henry
ATTORNEY.

Oct. 12, 1954

G. HENRY ET AL

2,691,247

PROCESS OF AND APPARATUS FOR DRAWING GLASS INTO SHEET FORM

Filed Aug. 4, 1949

INVENTORS
Georges Henry
Edgard Brichard
BY George Hadley
ATTORNEY

Oct. 12, 1954  G. HENRY ET AL  2,691,247
PROCESS OF AND APPARATUS FOR DRAWING
GLASS INTO SHEET FORM
Filed Aug. 4, 1949  4 Sheets-Sheet 3

INVENTORS
Georges Henry
Edgard Brichard
By George H. Corey
ATTORNEY

Oct. 12, 1954

G. HENRY ET AL 2,691,247

PROCESS OF AND APPARATUS FOR DRAWING
GLASS INTO SHEET FORM

Filed Aug. 4, 1949

INVENTORS
Georges Henry
Edgard Brichard
BY George Alcorey
ATTORNEY

Patented Oct. 12, 1954

2,691,247

UNITED STATES PATENT OFFICE 2,691,247

PROCESS OF AND APPARATUS FOR DRAWING GLASS INTO SHEET FORM

Georges Henry and Edgard Brichard, Jumet, Belgium, assignors to Union Des Verreries Mecaniques Belges S. A., Charleroi, Belgium, a Belgian company Application August 4, 1949, Serial No. 108,556

Claims priority, application Belgium December 17, 1948

17 Claims. (Cl. 49—17)

This invention relates to a process and apparatus for the vertical drawing of glass into sheet form, in a cooled chamber insulated from the atmosphere of the furnace, from a bath of molten glass bounded by a sheet-forming block or frame of refractory material.

To draw a glass sheet, it is necessary that the bulb which is formed initially under the action of the drawing effort should be generally rectilinear in cross-section and located in alignment with the vertical plane of the drawing machine, as otherwise the glass sheet will not be straight and may even break under compression between the drawing rollers.

The applicants have found that when the surface of the molten glass bounded by the block through which the drawing is effected is sufficiently large to be inclined slightly from the horizontal upon contact with the refractory walls of the block, the bulb becomes completely unstable and shifts from one wall to the other, thus producing a continuous rocking of the sheet.

This phenomenon is due to the fact that a surface film is formed symmetrically on each side of the bulb which commences the formation of the sheet, the said surface film being tensioned between the portion of the bulb to which the drawing effort is applied and the walls of refractory block to which it adheres on each side of the bulb. The said two surface films on the glass are cooled due to radiation and undergo cohesion which is a direct function of the time during which they are exposed to cooling, that is to say, an inverse function of their speed of translational movement towards the bulb.

If for any fortuitous reason one of the two films adheres more strongly than the other, it moves the bulb towards it without being drawn and becomes progressively cooler and its cohesion increases correlatively, while on the other hand the other film is fed further forward and becomes heated. The bulb thus moves until it reaches the refractory wall. Along this wall, the surface of the glass therefore inclines more from the horizontal and this inclination constantly increases until the adhesion between the film and the wall is overcome by the pull exerted by the drawing machine and transmitted by the sheet and this film is suddenly torn away from the wall and carried along in the sheet, thus uncovering some of the underlying glass, which has not been cooled and which is less viscous than the glass of the symmetrical film.

The said other film in turn drawns the bulb towards it and the phenomenon of the displacement of the bulb is repeated, and gives rise to a continuous rocking of the sheet, which occurs even if the temperature of the glass supplied for drawing is perfectly uniform.

The present invention is based upon a study of the above described phenomenon and upon the discovery that the rocking can be avoided if the continuity of the film is broken at a point situated between the bulb and the refractory wall of the block.

According to the present invention, this result is achieved by increasing the temperature on the surface of the glass on each side of the bulb, over a zone the length of which is equal to the length of the bulb and the width of which is smaller than the distance between the bulb and the wall of the refractory frame. These zones of increased temperature are preferably situated along the walls of the refractory block or frame or very near to the said walls. In fact, when the surface glass is heated in the vicinity of the line of contact with the refractory frame, the drawing speed is scarcely affected, which is contrary to what happens if the heating zone is relatively closer to the bulb at which the formation of the glass sheet is initiated.

However, it is not advisable to heat the actual edges of the refractory frame, which are normally relatively cold when they are in a chamber insulated from the atmosphere of the furnace. It may very easily happen in this case that crystals form against the refractory material due to the devitrification of the glass, the said crystals tending to migrate into the molten glass which is drawn towards the bulb by the drawing action. In order to avoid this disadvantage, it would be desirable to superheat the edges of the frame considerably so as to bring them to a temperature in the neighbourhood of the melting point of the crystals, which entails a considerable expenditure of thermal energy. It has, in fact, been found that at the normal temperature of the frame the rate at which the crystals grow is very low and in addition the crystals formed adhere strongly to the frame. The rate of growth of the crystals increases with the temperature of the frame, their adhesion to the frame decreasing at the same time.

The energy expenditure is moreover increased by the fact that, upon heating, the refractory material transmits its heat to the glass to a fairly considerable depth. Now, the applicants have found that it is unnecessary to heat more than a very small thickness of glass in the neighbourhood of the frame bounding the surface at which the drawing takes place, in order on the one hand to reduce the component of tractive force transmitted from the bulb to the refractory material in a sufficient proportion to eliminate all rocking of the bulb, and on the other hand either to eliminate or arrest the development of devitrification occurring on the surface of the glass, in such a manner that the said crystals continue to adhere to the relatively cold refractory wall and no longer migrate towards the sheet.

In carrying the invention into effect, the desired temperature conditions are generally obtained by protecting the surface of the glass against cooling due to radiation by means of screens extending above and in proximity to the surface of the glass, between the said surface and the cooling members situated in the chamber in which the drawing commences. The said screens can be constituted of separate elements such as plates, or they may advantageously be formed by extending the refractory walls of the frame above the surface of the glass and, if necessary, by curving them. In one form of embodiment, the said walls are so curved that their lower face only radiates towards incandescent surfaces such as the surface of the layer of glass or the foot of the sheet being drawn and that the line of contact between the surface of the molten glass and the wall of the frame can in turn only radiate towards the said lower face of the curved walls or towards incandescent surfaces.

Since the screens according to the invention are integral with the walls of the frame or are situated in immediate proximity thereto, they prevent any circulation between the atmosphere of the furnace and the surface of the glass bath on each side of the bulb, so that the bath is protected from the disturbing effect of gaseous currents of variable temperature coming from the outside, and it is possible to determine at will the temperature at the surface of the bath.

It is advisable, before commencing the operation, to take the precaution of heating the surface of the glass and the lower faces of the wall extensions of the frame by any desired means, so that the radiation of the underlying glass mass, which is hotter than the glass of the surface film, will be sufficient, owing to the added radiation resulting from the reverberation of the lower face of the curved extension of the walls of the frame, to maintain the temperature of the surface layer of the glass in the vicinity of its line of contact with the frame at a value sufficient to ensure the achievement of the desired result.

It is obvious that this result is also obtained if the extension of the walls of the frame is constituted by one or more independent elements of this frame, which are connected to the frame only during the drawing operations. Similarly, the frame may be constructed of one or more elements.

If the operating temperature selected for the drawing of the glass is relatively low, it will be desirable to provide additional thermal energy below the lower face of the extension of the frame. Heating elements composed of electric resistors of refractory material may be disposed below the said face and brought to incandescence by passing an electric current of sufficient strength through them.

Measures will preferably be taken to prevent the elements from radiating towards cold walls and care will be taken to limit closely the width of the strip of surface glass subjected to the radiation.

According to a further feature of the invention, the temperature conditions are so adjusted that they may vary according to requirement both at different points along the length of the bulb and at different instants during the process of production.

It has, in fact, been found that temperature differences may arise in the glass of the bulb either systematically or from localised accidental or fortuitous causes. The processes at present employed to remedy these temperature differences invariably produce internal tensions in the glass sheets.

According to the invention, substantially horizontal screens are employed, which are located immediately above the block or frame and the surface of the molten glass so as to act on the glass while it is still in bulb form and before it enters the bulb, the contour of the said screens being so designed as to vary from point to point along the bulb the amount of glass surface radiating freely upwards.

The said screens may be formed in one piece and are preferably adjustable in position. They may also be made in several parts and be provided with control means for displacing them independentaly of one another. It is thus possible to effect the adjustment according to the fluctuation of the temperature conditions in the course of time.

In addition, the screens may be interposed between the surface of the glass and the cooling members which are normally disposed on each side of the sheet being drawn, the action of the said screens thus being exerted in opposition to the action of the said members and combining with the latter action to adjust the temperature conditions of the bath. To this end, in accordance with the invention, the cooling members are given a widened form so as to extend their action over the surface of the bath uncovered by the screens, this action being modified by the relative displacement of the screens and of the cooling members.

In order to enable the nature of the invention to be well understood, a number of embodiments thereof are illustrated by way of non-limitative example in the accompanying drawings, in which.

Figure 1:
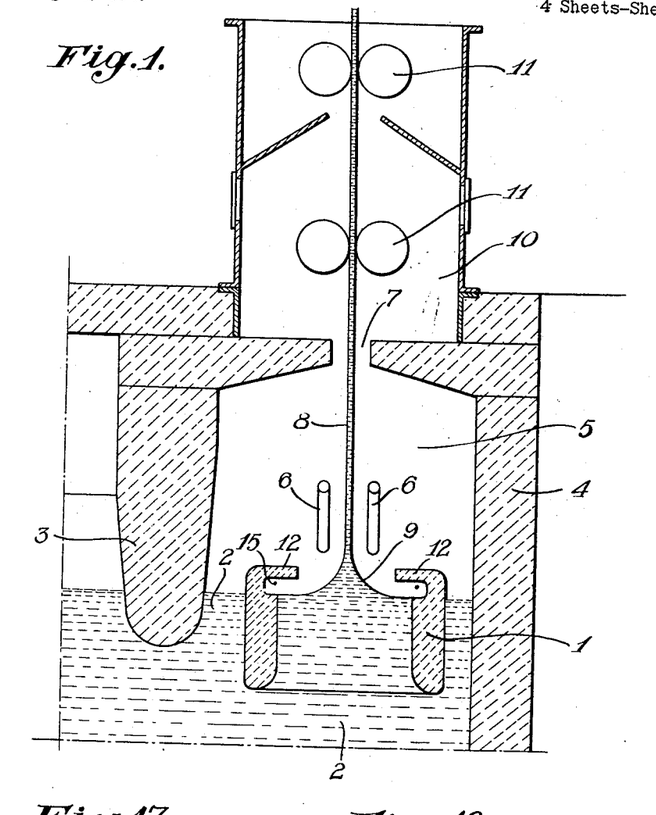
Figure 1 is a sectional elevation of the drawing installation according to the invention.
Figure 2:
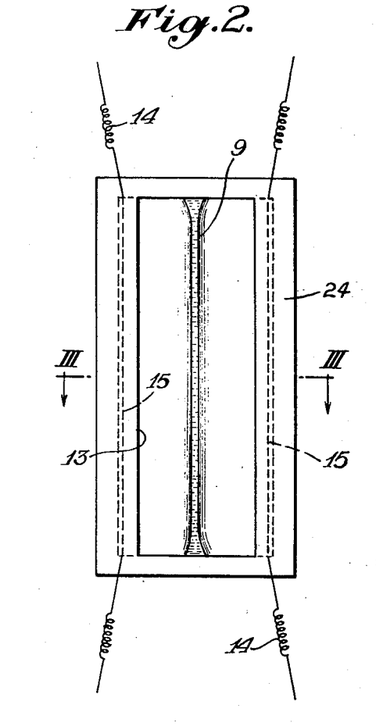
Figure 2 is a plan view of a block or frame of refractory material bounding a molten glass surface or bath from which the sheet of glass is drawn.

In Figure 1, 1 designates the block or frame of refractory material situated in a part 2 of the molten glass which part is separated from the main mass of glass by a partially immersed wall 3 which, together with the outer wall 4 of the furnace, defines a chamber 5 cooled by pipes 6 or other elements through which a cooling fluid is passed. The chamber 5 communicates with the outside through a gap 7 of sufficient width to afford passage to the glass sheet 8 being drawn, which is initially formed in the bulb 9 and passes between the cooling pipes 6 and then into the drawing shaft 10, in which it is taken up by the drawing rollers 11. The longitudinal walls of the frame 1 are extended towards the bulb at 12 and reflect downwardly the radiation from the glass, so as to maintain between the walls and the bulb a sufficient temperature to prevent the formation of surface films on the glass. Electrical heat resisting elements 15 are optionally located beneath extensions 12.

Figure 3:
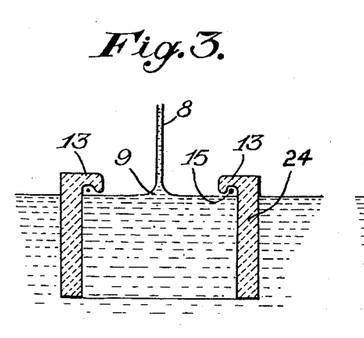
Figure 3 is a sectional view of this arrangement on the line III—III of Figure 2, Figures 4, 5 and 6 are sectional views showing modified embodiments of the invention.

In Figure 3, the longitudinal walls of the frame 24 are extended above the level of the glass by a curved portion 13 which limits in the upward direction the radiation from the glass surface adjacent the wall, so that such radiation can only be directed towards incandescent surfaces.

Stretched below each of these extensions, for example by means of springs 14, is a heating element 15 constituted by a filament or strip of temperature-resisting material through which an electric current of suitable strength can be passed.

Figure 4:
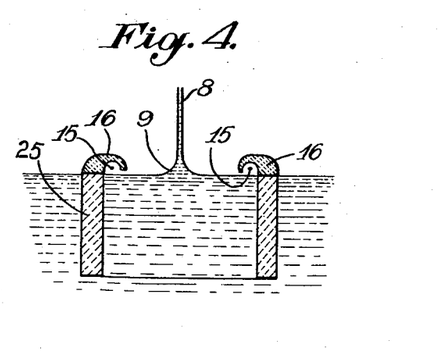

In Figure 4, the walls of the frame 25 are extended by additional elements 16. A heating resistor 15 consisting of a tensioned wire through which an electric current is passed radiates its heat towards the surface of the glass and towards the lower face of the additional elements.

Figure 5:
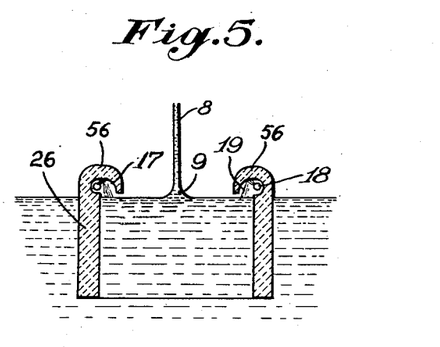

In the example shown in Figure 5, there is formed in each of the extensions 56 of the walls of the frame 26 a recess 17 into which is introduced a tube 18 of refractory material having orifices formed therein. Emerging from the said orifices are jets 19 of combustible gas, the flames of which are directed on to the lower faces of the said extensions, which reflect the heat towards the surface of the underlying glass surface.

Figure 6:
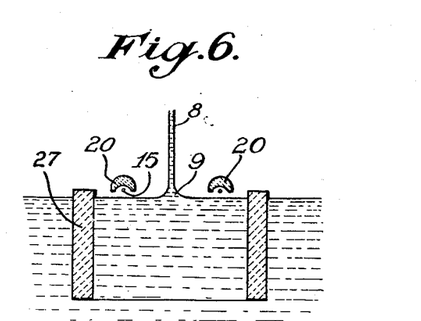

In Figures 1 to 5, the heated zones are immediately adjacent the longitudinal walls of the frame. Figure 6 shows a modification in which the heating wires 15 shielded by screens 20, resting on the frame 27 at their extremities, are approximately midway between the bulb 9 and the walls 1 of the frame.

Figure 7:
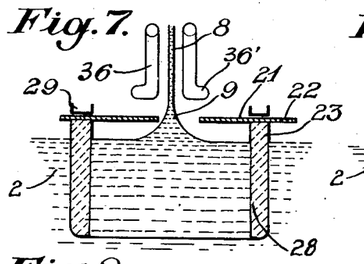
Figure 7 is a vertical section on the broken line VII—VII of Figure 8 through an arrangement disposed in the container or tank of a drawing installation.
Figures 8, 12:
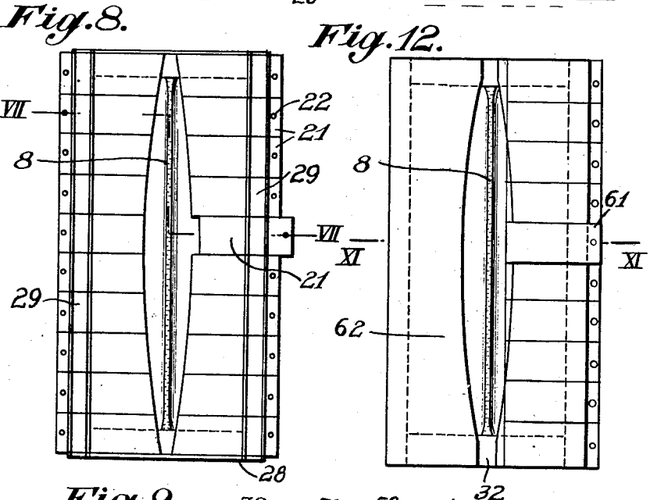
Figure 8 is a plan view of the same drawing arrangement.
Figures 11 and 12 are a vertical section and a plan view respectively of another form of the invention, Figure 11 being a section on the line XI—XI of Figure 12, Figures 13 and 14 are a vertical section and a plan view respectively of another form, Figure 13 being a section on the line XIII—XIII of Figure 14.

In Figures 7 and 8, 28 designates as before a frame of refractory material which is immersed in the molten glass bath 2 in the container or tank, similarly to the arrangement shown in Figure 1, and serves to delimit the molten glass surface from which the sheet is drawn. The drawing operation gives rise firstly to the formation of a bulb 9 and then to the glass sheet 8 which is subjected to the action of the cooling members 36.

Disposed above the frame 28 are screens which, in the example under consideration, are constituted by a series of metal plates 21 disposed side by side and each formed with a hole 22 into which a tool can be introduced to slide them over their support when it is required to displace them. The said screens are adapted to slide between the edge 23 of the frame 28 and a U-iron 29.

In order to simplify the drawing, the cooling elements 36 are not shown in Figure 8. In this figure, one of the screens 21 has been displaced longitudinally from its normal position in order to correct the temperature in that part of the bulb 9 which it faces. Figure 7 is a section on the broken line VII—VII of Fig. 8, which is taken through the screen 21 which has been displaced from its normal position to leave uncovered a larger portion of the bulb than do the other screens. This portion of the bulb will therefore radiate more intensely than the remainder of the bulb, which will produce a lowering of the temperature at this point.

Naturally, more than one of the screens 21 may be simultaneously displaced, such displacement varying in degree if required by the temperature conditions.

The cooling members for the glass sheet may advantageously be so disposed or shaped as to directly receive heat radiated from the sheet being drawn and also from the glass before it enters the bulb as well as when it is actually in the bulb. The screens being movable between the cooling members and the molten glass thus serve to regulate simultaneously the upward radiation from the molten glass and the cooling action of the cooling members.

To this end, the cooling members 36, which are generally in the form of pipes, may be widened at the bottom as indicated at 36' so that the widened portion thereof intensifies the downward cooling action.

Since the said cooling members are exposed to the radiation from the bath over the only part of their surface which is not covered by the screens, it is possible so to fashion them relatively to the inner edges of the screens as to render possible a convenient selective and graduated variation of the intensity of the cooling of the bath along the bulb at which the sheet is formed.

Moreover, if the position of the cooling members is made adjustable relatively to the screens, either by displacement of the cooling members or by displacement of certain elements of the screens or even of the entire screens, without deforming the screens as a whole, the distribution of the cooling can be varied along the bulb according to the temperature conditions obtaining during operation.

Figures 9, 10:
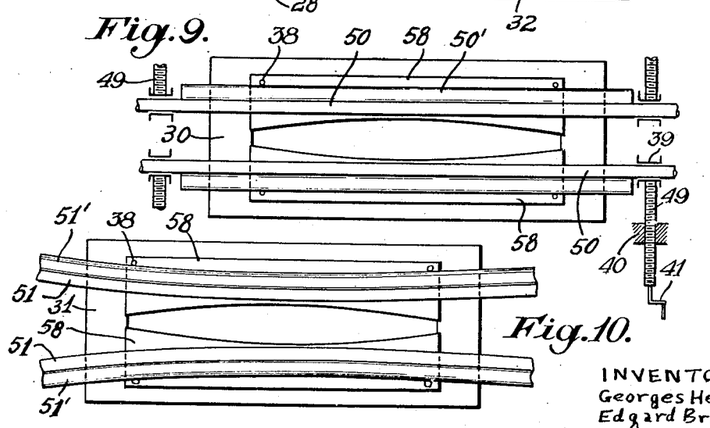
Figures 9 and 10 are plan views showing two other arrangements.

Embodiments of arrangements of this nature are illustrated by way of example in Figures 9 and 10.

Figure 9 shows a frame 30 and an arrangement in which the cooling pipes 50 are straight. In Figure 10 there is shown a frame 31 and pipes 51 so curved that their convexity faces towards the sheet. The screens are formed in both cases of continuous plates, of which the edge nearer the sheet is so curved as to have its concavity facing towards the sheet.

In the example shown in Figure 9 the edges of the curved screen 58 may be positioned below the cooling members so that only the mid-portion of the sheet-forming bulb is exposed to the cooling members. If, on the other hand, the cooling member is completely exposed in the direction of the bulb it acts uniformly on the whole of the bulb. In an intermediate position, it acts in accordance with a law governed by the curvature of the screen. Similar advantages are obtained in cases where, as in Figure 10, curved screens 58 are partly covered by cooling members of different curvature.

Each screen 58 has formed therein two holes 38 to permit the introduction of a tool for the manipulation thereof. The lateral movement of the cooling pipes is obtained by placing at each extremity of each pipe a control device of the type shown in Figure 9. The extremity of the pipe 50 has mounted thereon a sleeve 39 connected to a screw 49 turning in a fixed bearing 40 and actuated by a crank 41. The said pipes are enlarged at their lower sides (50' in Fig. 9 and 51' in Fig. 10), with the object of increasing to the maximum the variation of the cooling action of the pipes in the direction of the bath and the bulb as a function of the position of the said pipes.

Figure 13:
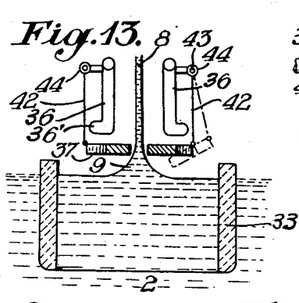
Figure 14:
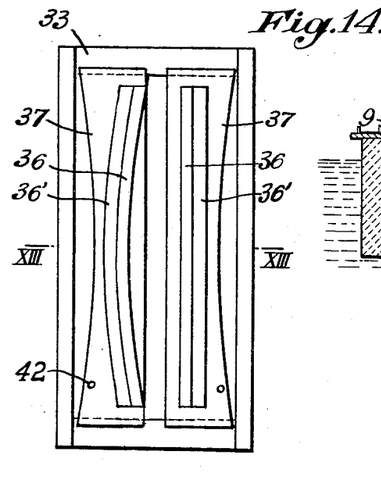
Figure 15:
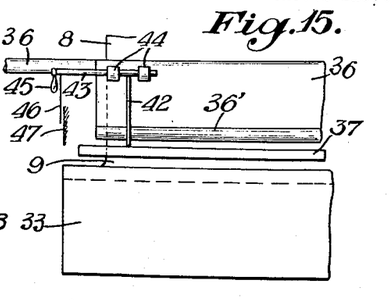
Figure 15 is a side view of the arrangement shown in Figure 13.

A further form of the invention is shown in Figures 13, 14 and 15. In this embodiment, the screens 37 have straight inner edges, while the outer edges thereof are concave. The cooling members 36 have the same enlarged portion 36' at the base as in the preceding cases. The screens are not in this case mounted on the edges of the frame 33, but are suspended from the cooling members 36 in the following manner; to each extremity of the outer edge of each screen 37 is secured a rod 42 which is secured to another horizontal rod 43, which rests on two brackets 44 connected to the cooling member 6 and in which it can pivot. The rod 43 comprises at its free extremity a crank 45 and an index 46 which moves past a graduated dial 47 to indicate the amplitude of the movements of the screen 37. In Figure 13, one of the screens 37 is shown in broken lines after displacement from its normal position.

It will be observed that in the displaced position the screen 37 uncovers the bulb to a greater extent than in its normal position. Since its inner edge is straight, the increase in the cooling of the bulb is uniform over the entire length thereof. However, on the other hand, since the outer edge is curved the radiation from that portion of the glass bath which is situated below this curved edge is less intense towards the edges of the sheet than at its centre. There will thus result a general cooling due to the straight inner edge, this action being accompanied by a relative cooling of the centre with respect to the extremities owing to the curved outer edge. Conversely, if the screen shown in broken lines is moved to its normal position, a general uniform heating of the bulb will be produced owing to the straight inner edge, but this heating will be modulated by the curved outer edge which will produce a moderation of the heating at the centre. This arrangement has the advantage that it prevents particles of substance from leaving the frame or the formation of streaks of heterogeneous glass due to the corrosion of the refractory substance of the frame because it enables the edge of the frame to be maintained at a lower temperature than if it were covered by the screen.

Figure 11:
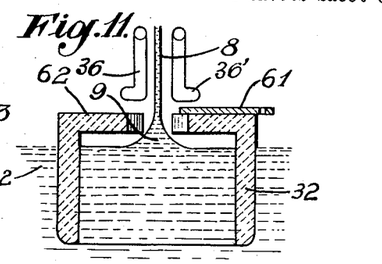

A further form is shown in Figures 11 and 12, in which the screens form integral extensions of the refractory frame 32. The screens, which thus constitute cornices 62 of the frame 32 are so shaped as to uncover a pseudo-elliptical area of the surface of the bath.

Situated above each cornice is a cooling pipe or caisson 36 widened at the base 36' and provided with means for displacing it horizontally above the screens and the glass bath, similar to those shown in Figure 9.

It has been observed that this arrangement affords a great advantage. In fact, if communication exists between the atmosphere of the furnace or of the drawing tank and the space situated between the screens and the edges of the frame 32, it is found that currents of hot or cold gas, according to the case, are set up between the screens and the glass. They vary undesirably the temperature of the screen and of the glass, and the conditions of cooling by radiation which it is desired to control. These currents of gas also frequently vary considerably in intensity and in position according to the circumstances which happen to arise. Such variations and the corresponding fluctuations in the cooling of the glass impair very considerably the regularity of the surface of the drawn sheet. The aforesaid arrangement avoids these disadvantages.

The cornices 62 of the frame 32 can be covered by other displaceable screens 61 (only shown on one side in the Figures 11 and 12) by means of which it is possible to correct and to complement locally or over an extensive zone the action of the fixed screens constituted by the cornices 62.

It has been found that this arrangement facilitates a well graduated correction of the temperature differences of the bulb 9. The movable screens 61 can be so mounted as not to reflect the radiation of the glass but to heat the fixed screen 62, in which case the action of the said screens on the glass is indirect. If, as is the case in Figures 11 and 12, the precaution is taken of making the fixed screen or cornice 62, which is directly exposed to the radiation from the glass, of a refractory material of fairly considerable thickness, that is to say one or more centimetres, and having relatively high heat-conducting capacity such as refractory metal alloys or compact ceramic materials, there is effected in respect of the movable screen 61, which is preferably constituted of a heat-insulating material, a lateral dispersion which is favourable to a good graduation of the required correction.

The movable screens 61 can project inwardly beyond the fixed screens 62 and directly overhang an inner portion of the glass bath surface along all or a part of the length of the bulb. In this case it may be desirable to also curve the inner edge of the screens 61 exposed to the radiation in order to obtain a better graduation and distribution of their action. In this way the cooling of the bulb may be varied by movement of one or more of the movable screens 61 relative to the fixed screens 62 and cooling members 36.

Figure 17:
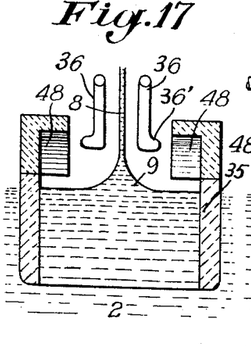
Figures 17 and 18 show in cross-section and in longitudinal section respectively another modification of the arrangement according to the invention.
Figure 18:
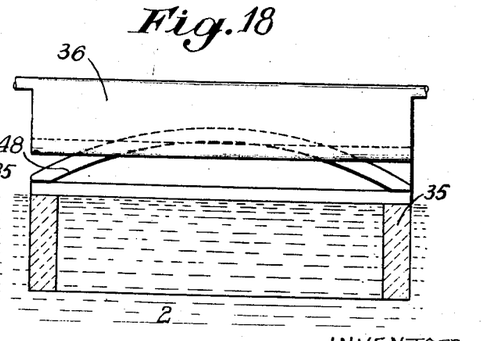

Figs. 17 and 18 show a frame 35 and an arrangement whereby a screen 48 is employed which is arched so that the distance from its lower face to the glass bath surface or to the bulb varies from point to point. The arched screens 48 are so disposed that a horizontal projection thereof would intersect the cooling pipes 36. The latter can therefore radiate below the screens 48 and thus exert on the glass situated below them an action which decreases progressively from the centre to the edges, and which undergoes a well graduated moderation in the vicinity of the edges, which may in certain cases afford an advantage as compared wtih the preceding arrangements.

The edge of the arched screen may be given a curvature as seen in horizontal projection, and it is thus possible to fix a suitable law for the variation of the distribution of the cooling of the glass along the bulb.

When the temperature of the glass is adjusted along the bulb by the method and the means hereinbefore described, it is found that it is useful to provide gaps in the screens opposite the points at which the edges of the sheet are formed in order that the said edges, which remain at a lower temperature than the remainder of the sheet, may have sufficient cohesion to resist the surface tensions which tend to shorten the bulb and to contract the sheet.

Figure 16:
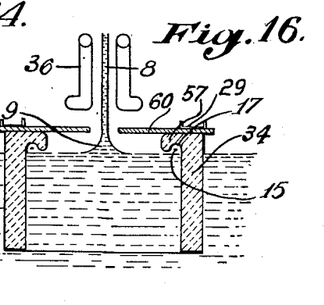
Figure 16 shows in vertical section an arrangement provided with additional means for heating the glass.

The form of embodiment of the invention illustrated in Figure 16 is similar to that of Figure 3, but comprises in addition movable screens 60 mounted on the cornices 57 of frame 34, the edge of which may be straight or curved. With this arrangement, it is possible to create at will an increase in the temperature of the glass along the longitudinal walls of the frame and to expose a greater area of glass in the vicinity of the bulb to the radiation from the cooling members 36 so as to increase the extent of the regulation of the temperature condiitons during the drawing.

Naturally, modifications may be made in the form of the various arrangements illustrated without departing from the scope of the invention.

I claim:

1. Apparatus for drawing glass vertically from a heated bath of molten glass, comprising a hollow, generally rectangular frame of refractory material partially immersed in the bath, means for drawing a sheet of glass vertically from the surface of the bath defined by said frame, said drawing means being effective to form a bulb of glass at the junction of the bath and the sheet, said frame being substantially wider than the base of the bulb so as to provide horizontal glass surfaces between both sides of the base of the bulb and the frame, a pair of coolers extending along the opposite sides of the sheet above the bulb and exposed to direct radiation from the bulb, and screening means spaced above said horizontal surfaces and extending inwardly of the longitudinal sides of the frame between said coolers and portions of said horizontal surfaces adjacent said longitudinal sides of said frame, said screening means being effective to reflect heat radiated from the glass back against said surface portions and maintain therein local zones of a higher temperature than in the surface portions of said bulb that are in direct heat radiating relation to said coolers.

2. An apparatus as claimed in claim 1 in which the screening means includes laterally adjustable horizontally disposed plates supported on the upper horizontal surfaces of the side walls of said refractory frame.

3. An apparatus as claimed in claim 1 in which said screening means are formed at least in part by inwardly and downwardly curved extensions of said longitudinal sides of said refractory frame, said extensions being located above the surface of the molten glass within the frame and having their lowermost faces in the immediate vicinity of the said surface.

4. An apparatus according to claim 1 in which said screening means are located on each side of said sheet and have concave outer edges and in which said cooling means are operated by water circulation and are located immediately above said screening means, said cooling means having a curvature which differs from the curvature of the outer edges of said screening means.

5. An apparatus according to claim 1 in which said screening means are of arched form.

6. Apparatus for drawing glass vertically from a heated bath of molten glass, comprising a hollow, generally rectangular frame of refractory material partially immersed in the bath, means for drawing a sheet of glass vertically from the surface of the bath defined by said frame so as to form a bulb of glass at the junction of the bath and the sheet, said frame being substantially wider than the base of the bulb so as to provide horizontal glass surfaces between both sides of the base of the bulb and the frame, said frame having extensions projecting inwardly from the upper portions of its longitudinal sides, said extensions overhanging the portions of said horizontal surfaces nearest said longitudinal sides of the frame, said extensions having flat under surfaces which are effective to reflect heat radiated from the glass back against said surface portions and thereby create therein zones of locally increased temperature.

7. Apparatus for drawing glass vertically from a heated bath of molten glass, comprising a hollow, generally rectangular frame of refractory material partially immersed in the bath, means for drawing a sheet of glass vertically from the surface of the bath defined by said frame so as to form a bulb of glass at the junction of the bath and the sheet, said frame being substantially wider than the base of the bulb so as to provide horizontal glass surfaces between both sides of the base of the bulb and the frame, said frame having extensions projecting inwardly from the upper portions of its longitudinal sides, in overhanging relation to only the portions of said horizontal glass surfaces nearest said longitudinal sides of the frame and terminating in spaced relation laterally of the sides of the base of said bulb thereby leaving portions of said horizontal glass surfaces adjoining said bulb uncovered by said extensions, said extensions having concave under surfaces which are effective to reflect heat radiated from the molten glass back to said horizontal glass surface portions nearest the longitudinal sides of the frame and thereby maintain the surface portions of the glass immediately under said extensions at a higher temperature than the temperature of said uncovered surface portions of the glass.

8. Apparatus for drawing glass vertically from a heated bath of molten glass, comprising a hollow, generally rectangular frame of refractory material partially immersed in the bath, means for drawing a sheet of glass vertically from the surface of the bath defined by said frame so as to form a bulb of glass at the junction of the bath and the sheet, said frame being substantially wider than the base of the bulb so as to provide horizontal glass surfaces between both sides of the base of the bulb and the frame, and a pair of elongated reflectors spaced above said horizontal glass surfaces and extending in a generally horizontal plane over portions of said horizontal surfaces between and spaced from the longitudinal sides of said frame and the bulb, said reflectors having concave under surfaces which are effective to reflect heat radiated from the glass back against said surface portions and create therein zones of locally increased temperature.

9. In a process of drawing glass in sheet form vertically from a localized area of a bath of molten glass confined within a drawing frame partially immersed in said bath and having the longitudinal sides thereof extending in parallel spaced relation to the sides of the bulb of glass formed at the junction of the bath and the sheet in the drawing operation, the improvement which comprises the steps of cooling the bulb surfaces and the portions of the sheet surfaces adjacent thereto by directly radiating heat from said bulb and said sheet surfaces to positively cooled heat-absorbing surfaces disposed in proximity thereto while maintaining zones of relatively high temperature in the surface portions of said localized area adjacent and parallel to said longitudinal sides of said frame by reflecting heat radiation from said zones back onto the surface portions in said zones.

10. A process for the vertical drawing of sheet glass as claimed in claim 9 wherein said reflected radiation from the said zones is augmented by heat radiation supplied from an external source.

11. Apparatus for the vertical drawing of glass in sheet form from a heated bath of molten glass, comprising a rectangular drawing frame partially immersed in said bath and confining a localized area of the bath of molten glass, means for drawing a sheet of glass vertically from said localized area of the bath so as to form a bulb of glass connecting the horizontal surface of said localized area of the bath with the vertical surfaces of said sheet, said drawing means and said frame being so associated as to dispose said bulb between and in parallel relation to the longitudinal sides of said frame, a cooling chamber located immediately above said bulb and surrounding said sheet, cooling means in said cooling chamber exposed to direct radiation from said sheet, said bulb, and the inner portions of said horizontal glass surface adjoining the base of said bulb, and reflecting means interposed between the cooling means and the outer portions of said horizontal glass surface, said reflecting means being spaced from said bulb and positioned to reflect heat radiation from said outer portions back onto said outer portions.

12. Apparatus for the vertical drawing of glass in sheet form from a heated bath of molten glass, comprising means for drawing a sheet of glass vertically from a bath so as to form a bulb of glass connecting the horizontal surface of said bath with the vertical surfaces of said sheet, a cooling chamber located immediately above said bulb and surrounding said sheet, cooling means in said cooling chamber exposed to direct radiation from said sheet, said bulb, and the inner portion of said horizontal glass surface adjacent the base of said bulb, reflecting means interposed between the cooling means and outer portions of said horizontal glass surface in spaced relation to said bulb, and a heating element spaced below said reflecting means in heat radiating relation thereto, said reflecting means being positioned to reflect heat radiation from said outer portions and said heating element to said outer portions of said horizontal surfaces.

13. Apparatus for drawing glass vertically from a heated bath of molten glass, comprising a hollow, generally rectangular frame of refractory material partially immersed in the bath, means for drawing a sheet of glass vertically from the surface of the bath defined by said frame so as to form a bulb of glass at the junction of the bath and the sheet, said frame being substantially wider than the base of the bulb so as to provide horizontal glass surfaces between both sides of the base of the bulb and the frame, a pair of coolers extending along the opposite sides of the sheet above the bulb and exposed to direct radiation from the bulb and inner portions of said horizontal surfaces adjacent the base of the bulb so as to cool the bulb surface and said adjacent inner horizontal surface portions, and screens spaced above said horizontal surfaces and extending inwardly of the longitudinal sides of the frame over portions of said horizontal surfaces spaced from the bulb, said screens being effective to reflect heat radiated from the glass back against said surface portions and maintain therein local zones of a higher temperature than in said inner horizontal surface portions and said bulb surface.

14. Apparatus for drawing glass vertically as defined in claim 13, in which said screens are movable laterally through a substantial range of positions to vary gradually the areas of said increased temperature zones and of said cooled portions of the horizontal surface.

15. In the process of drawing glass in sheet form from a bath of molten glass disposed within a drawing chamber isolated with respect to the atmosphere of the glass melting furnace supplying molten glass to said chamber, the improvement which comprises drawing glass in sheet form upwardly from a localized area of said bath confined within a drawing frame partially immersed in said bath and having the longitudinal sides thereof extending in generally parallel and spaced relation to the sides of the bulb of glass formed at the junction of the bath and the sheet in the drawing operation, cooling the bulb surfaces and the portions of the sheet surfaces adjacent thereto by directly radiating heat from said bulb and said sheet surfaces to positively cooled heat-absorbing surfaces disposed in proximity thereto, and simultaneously maintaining zones of relatively high temperatures in surface portions of said localized area adjacent and parallel to said longitudinal sides of said frame by reflecting radiation from said zones back onto the surface portions of said zones.

16. Apparatus for the drawing of glass in sheet form, comprising a glass drawing chamber in communication below the normal bath level therein with a glass melting furnace supplying molten glass thereto, said chamber having enclosing side walls extending below the bath level and isolating said chamber from the furnace atmosphere, a rectangular drawing frame of refractory material partially immersed in the bath contained within said chamber, means for drawing a sheet of glass vertically from the surface of the bath defined by said frame so as to form a bulb of glass at the junction of the bath and the sheet, said frame being substantially wider than the base of the bulb so as to provide horizontal glass surfaces between both sides of the base of the bulb and the frame, a pair of coolers extending along the opposite sides of the sheet above the bulb and exposed to direct radiation from the bulb and inner horizontal surface portions, and screens spaced above said horizontal surfaces and extending inwardly of the longitudinal sides of the frame over outer portions of said horizontal surfaces adjacent the longitudinal sides of the frame spaced from the bulb, said screens being effective to reflect heat radiated from the glass back against said outer surface portions and maintain therein local zones of a higher temperature than in said inner horizontal surface portions and said bulb surface.

17. Apparatus for the vertical drawing of glass in sheet form from a heated bath of molten glass, comprising means for drawing a sheet of glass vertically from said bath so as to form a bulb of glass connecting the horizontal surface of said bath with the vertical surfaces of said sheet, a pair of coolers extending horizontally along the opposite sides of the sheet above said glass surface in position to receive direct radiation from said sheet, said bulb, and the inner portion of said horizontal glass surface adjacent the base of said bulb, arch-shaped reflectors spaced above said horizontal glass surface and disposed laterally outwardly from said coolers, each said reflector having the opposite ends thereof spaced near said bath surface and extending below the lower edges of said coolers and having an intermediate curved portion of the arch extending above the lower edges of said coolers, whereby each said reflector is interposed between the cooler adjacent thereto and the portion of said horizontal glass surface positioned beneath said reflector only at and adjacent the ends of said coolers.

References Cited in the file of this patent

UNITED STATES PATENTS

| Number | Name | Date |
|---|---|---|
| 713,758 | Giuannotte | Nov. 18, 1902 |
| 821,786 | Colburn et al. | May 29, 1906 |
| 1,007,503 | Sweet | Oct. 31, 1911 |
| 1,489,876 | Whittemore | Apr. 8, 1924 |
| 1,556,726 | Slingluff | Oct. 13, 1925 |
| 1,558,986 | Jones | Oct. 27, 1925 |
| 1,795,943 | French | Mar. 10, 1931 |
| 1,826,006 | Kupferschmid | Oct. 6, 1931 |
| 1,865,811 | Amsler | July 5, 1932 |
| 1,872,699 | Drake | Aug. 23, 1932 |
| 1,887,414 | Le Roy | Nov. 8, 1932 |
| 2,258,121 | Menoher | Oct. 7, 1941 |
| 2,278,328 | Magrini | Mar. 31, 1942 |
| 2,297,737 | Batchell | Oct. 6, 1942 |
| 2,313,495 | Tanberg | Mar. 9, 1943 |
| 2,336,510 | Spinasse | Dec. 14, 1943 |
| 2,352,539 | Halbach et al. | June 27, 1944 |
| 2,417,094 | Spinasse | Mar. 11, 1947 |
| 2,422,640 | Yamamoto | June 17, 1947 |

FOREIGN PATENTS

| Number | Country | Date |
|---|---|---|
| 180,518 | Switzerland | Feb. 1, 1936 |
| 454,643 | Germany | Jan. 13, 1928 |
| 589,950 | Great Britain | July 3, 1947 |
| 823,709 | France | Oct. 25, 1937 |
| 880,108 | France | Dec. 18, 1942 |